Aug. 19, 1941.   H. S. WHELLER   2,252,954
HEATING DEVICE
Filed April 13, 1938

INVENTOR.
Harry Stewart Wheller
BY
ATTORNEY.

Patented Aug. 19, 1941

2,252,954

UNITED STATES PATENT OFFICE 2,252,954

HEATING DEVICE

Harry Stewart Wheller, New York, N. Y., assignor to L. J. Wing Mfg. Co., New York, N. Y., a corporation of New York Application April 13, 1938, Serial No. 201,653

3 Claims. (Cl. 98—40)

This invention relates to heating devices having revolving discharge outlets, of the type described in my United States Letters Patent No. 2,000,112 granted to me on the 7th day of May, 1935, and more particularly to the provision of an air seal between the stationary casing and revolving outlet.

In the heating devices of the character illustrated in said patent, air is forced by a fan through a heater arranged in the casing and then through a revolving discharge outlet continuously to successive parts of the working area with the purpose in view of uniformly and evenly distributing the stream of heated air throughout the said area.

In such heating devices, in order to revolubly arrange the air discharge outlet on the heater casing to permit free, unimpeded rotation thereabout, a substantial opening or gap intermediate the casing enclosing the heater and the walls of the discharge outlet must be provided.

Some of the air heated by such devices leaks or escapes through such opening or gap and is therefore wasteful since it is not usefully distributed into the working area.

The present invention, therefore, contemplates the provision of revolving discharge heaters which are of maximum efficiency and from which all of the heated air is forced through the discharge outlets and usefully distributed without any waste.

The invention contemplates the provision of heating devices of the character described wherein the necessary gap intermediate the heater casing and the revolving air discharge outlet is sealed or otherwise shielded, to prevent escape of heated air therethrough, without interfering with the revolving movement of the air discharge outlet, thereby insuring maximum heating efficiency for the device.

All of the above advantages and many others will become more apparent from the several practical embodiments which are illustrated in the accompanying drawing, in which Fig. 1 is a top plan view of one embodiment of the invention;

Figure 1:
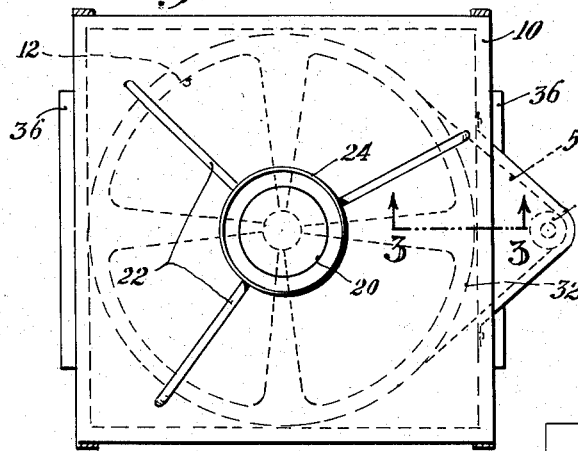

In the illustrated heating devices, there is provided a heater casing 10. The casing may be a type suitable to be supported in the upper part of a room, in the manner well known in the art, or on a wall, or to be disposed on the floor. The casing 10 may be of any desirable shape, however, a rectangular shape being shown in the illustrated embodiments.

Opposed walls of the casing are provided with openings whereby its interior is freely open to the outer air at opposed ends so that air may be forced therethrough.

To heat the air forced through the casing by the fan 12 mounted adjacent its upper end, a heating unit 14 is arranged within the casing consisting, preferably, of heating tubes 15 secured to the steam and return headers 16 which are fastened within the casing in any suitable manner that will readily suggest itself to any one skilled in the art. The heating tubes 15 may, if desired, be provided with a series of heat radiating fins 18 arranged, preferably, in line with the direction of air flow.

The fan 12 may be supported at the inlet opening of the casing, preferably, directly upon the shaft of the motor 20, the casing of which is supported by arms 22 immediately above the inlet opening. A crown member 24 may be provided for the fan motor 20 to protect it from the deteriorating effects of the heated air.

Figure 3:
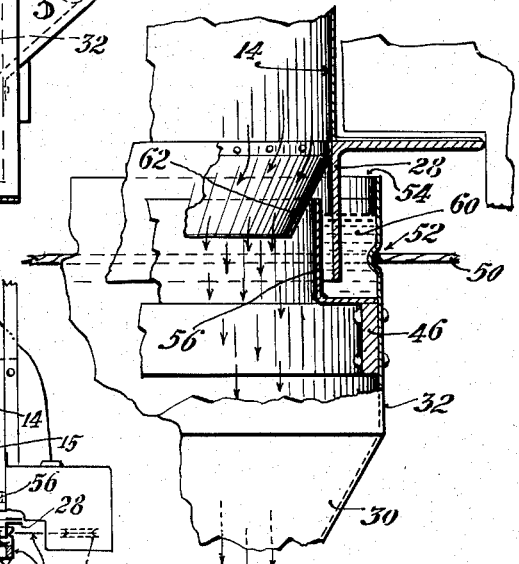
Fig. 3 is an enlarged fragmentary sectional view of the same taken along line 3—3 of Fig. 1, showing a modified structure thereof.
Figure 2:
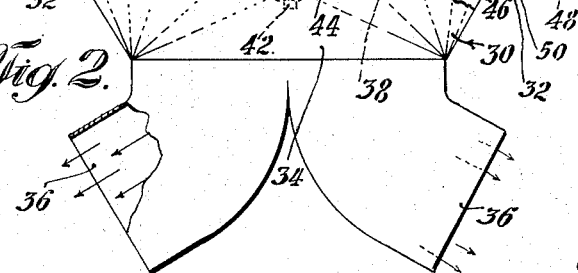
Fig. 2 is a vertical sectional view of the same.

While the air inlet opening of the casing may be of any desirable outline, preferably occupying the entire casing area, the air outlet opening of the casing, in order to be associated with a revoluble discharge member, is preferably made circular and is defined by an outwardly extending cylindrical flange 28, which may be integral with the casing wall or may comprise a separate cylindrical member secured to the casing in any desirable manner such as illustrated in Figs. 1, 2 and 3.

The revoluble discharge member 30 comprises an upper annular wall 32 adapted to fit closely but freely adjacent the casing flange 28, either around it, as illustrated, or within it, if desired, so as to be revoluble thereagainst, a main body portion 34, of any desirable shape or size, leading to one or more discharge nozzles 36 directed at an angle to the axis of the casing whereby the heated air is discharged sideways into the room.

To revolubly support the discharge member on the casing, any desirable means may be used. One relatively simple and economical means is illustrated and comprises a spider 38, provided within the casing, preferably below the heater 14 from the hub 40 of which a shaft 42 depends and is freely and rotatably engaged in any suitable manner by a hub 44 of a second spider 46 arranged in the upper part of the discharge member 30. Any suitable means for revolving the discharge member may be used for the purposes of the present invention, such as is more particularly illustrated in my Patent No. 2,000,112. In the embodiments illustrated herein, such means comprises a motor driven pulley 48 arranged adjacent the discharge member and parallel to it, which pulley engages a belt 50 supported in a peripheral groove 52 arranged on the exterior of the upstanding annular wall 32 of the discharge member.

While the heater device structure thus described will effectively operate to circulate and distribute heated air evenly throughout an adjacent area, it is somewhat wasteful for the reason that, as previously explained, a portion of the heated air leaks or escapes from the heating device through the gap 54 intermediate the discharge member and casing without being usefully circulated.

The leakage of heated air may be comparatively substantial because of the back pressure created by the discharge of the air through the relatively restricted area of the outlet nozzles, which thereby causes escape of air through the gap under considerable pressure.

I have, therefore, provided in the heating devices of the present invention means to prevent the escape of heated air through the gap either by sealing the gap or by otherwise diverting the heated air away therefrom.

In Figures 1, 2 and 3, I have shown one means for preventing leakage of the heated air. For that purpose, I provide, on the discharge member, adjacent the upper end thereof, a liquid tight trough 56, within which the flange 28 of the casing may fit when the discharge member is operatively and rotatably arranged on the casing. It will be readily understood that when the discharge member is arranged to fit around the flange 28, as illustrated, the trough 56 will be arranged inwardly of the discharge member, also as illustrated, and that when the discharge member is arranged to revolve within the flange 28, the trough 56 will be arranged on the exterior of the discharge member.

It may here be stated that numerous other modifications in the arrangement of the seal forming parts may be made, if desired. Thus, the liquid tight trough may be arranged on the flange 28, either interiorly or exteriorly thereof and the upper annular wall 32 of the discharge member may be provided with a depending flange, bent either outwardly or inwardly to fit in the trough arranged on the flange, in the manner and for the purpose that will be readily understood.

The trough 56 may be formed in any of the numerous ways that may suggest themselves to those skilled in the art, such as by means of the L-shaped annular metal strip 58 which may be soldered, welded or riveted to the proper face of the annular wall 32 of the discharge member 30.

It will now be apparent that, when the discharge member is arranged on the casing, the flange 28 of the casing will be disposed within the trough 56, and that by placing into the trough a suitable liquid 60, preferably a heavy viscuous high-boiling fluid, such as a heavy oil, to a level above the lower edge of the annular flange, an air tight seal will be formed that will prevent leakage of air without interfering with the revolving of the discharge member.

To prevent any possible danger of expulsion of the fluid from the trough by the pressure of the fan driven air, I may provide the casing with an apron 62 secured, preferably, on the upper portion of the flange 28 and extending therefrom diagonally downwardly over the trough to a point below its upper edge, as illustrated in Fig. 3.

It will be clear that the apron 62 will shield the fluid within the trough from the direct pressure of the fan driven air and will direct such air away from the trough, subjecting the fluid therein only to the relatively lesser force of the back pressure of the air.

Figure 4:
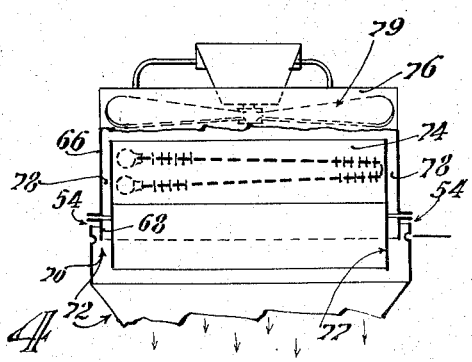
Fig. 4 is a diagrammatical side elevational view of another modification of a heater of the present invention.

In Fig. 4 of the drawing, I have shown, diagrammatically, a modified embodiment of the present invention where, in place of completely sealing the device against leakage of air, provision is made whereby only cool, unheated air passes through the gap 54 and the entire volume of heated air is available for revoluble distribution through the discharge outlets.

In the last modified embodiment, the heating device comprises a fan supporting casing 66, which may be of any desirable shape, and if not cylindrical may be provided at its outlet end with an annular depending flange 68 adapted to fit within the annular upper wall 70 of a revoluble discharge member 72.

Within the casing, a heater 74, of any type, such as described above, is surrounded by a housing 76, having a depending apron 77, of cylindrical shape, which extends downwardly below the lower edge of the flange 68 a substantial distance into the discharge member to carry the heated air forced therethrough well below the gap 54 formed intermediate the discharge member and the flange 68.

The heater housing is of lesser diameter than the flange 68 so that an air space 78 is formed between the housing and the casing and flange.

It will be apparent that the fan 79 positioned above the heater housing 76 will force air through the housing over the heater and will also force air about the housing, through the air space 78, where it is not heated, so that at all times there will be an envelope of unheated air entering into the discharge member.

It will also be apparent that the unheated air passing through the annular space 78 will be at higher velocity than the heated air emerging from the housing apron 77, due to the fact that the former has not encountered the resistance of the heaters 74. A high velocity air stream, or shell, will, therefore, be maintained, which will prevent leakage of heated air because the heated air could not pass upwardly against the greater velocity of the surrounding unheated air stream. Any air that will leak or escape through the gap 54 must, of necessity, be unheated air which enters the discharge member closest to the gap 54.

It will be obvious that I have provided a heating device having a rotating discharge member, from which none of the heated air escapes or is wasted, but in which the entire heated air stream is directed through the outlets of the revoluble discharge member and usefully circulated in the room.

It is to be understood that the practical embodiments of my invention that have been heretofore described and illustrated are by way of example only, and are not to be considered as limiting such invention; and that I desire to be protected for any modifications or variations of the invention that may be made within its spirit and scope and within the scope of the claims hereto appended.

I claim:

1. In a device of the character described, in combination, a casing having an air outlet, air heating means arranged in the casing, means for circulating a stream of air through the casing secured thereto, an annular flange arranged on the casing adjacent the air outlet and defining said outlet, said flange extending downwardly from the casing and an air discharge member mounted on the casing for rotation relatively thereto, said air discharge member including an annular wall and a metal strip suitably bent and secured to said wall to form therewith a fluid holding annular trough, an air seal forming fluid provided in the trough, said flange arranged in the trough and extending into the fluid.

2. In a device of the character described, in combination, a casing having an air outlet, air heating means arranged in the casing, means for circulating a stream of air through the casing secured thereto, an annular flange arranged on the casing adjacent the air outlet and defining said outlet, said flange extending downwardly from the casing and an air discharge member mounted on the casing for rotation relatively thereto, said air discharge member including an annular wall and a metal strip suitably bent and secured to said wall to form therewith a fluid-holding trough, an air seal forming fluid arranged in the trough, said flange arranged in the trough and extending into the fluid and an apron arranged adjacent the flange and extending inwardly thereof and downwardly therefrom to a point below the trough.

3. In a device of the character described, in combination, a casing having an air outlet, air heating means arranged in the casing, means arranged on the casing for circulating a stream of air therethrough, an annular flange secured to the casing adjacent the air outlet, the lower edge of said flange defining said air outlet, said flange extending downwardly from the casing, an air discharge member mounted on the casing for rotation relatively thereto, said air discharge member including an annular wall extending toward the casing to a point beyond the lower edge of the flange and an apron arranged inwardly of the flange and extending downwardly from the casing to a point beyond the lower edge of the flange.

HARRY S. WHEELER.